(No Model.)

A. W. OBERMANN.
COOKING VESSEL.

No. 349,317. Patented Sept. 21, 1886.

WITNESSES:
Adam Geo. White
M. J. Clapett

INVENTOR
August W. Obermann
BY Wm H Lotz
ATTORNEY

N. PETERS. Photo-Lithographer. Washington, D. C.

UNITED STATES PATENT OFFICE.

AUGUST W. OBERMANN, OF PITTSBURG, PENNSYLVANIA.

COOKING-VESSEL.

SPECIFICATION forming part of Letters Patent No. 349,317, dated September 21, 1886.

Application filed August 17, 1883. Renewed July 29, 1885. Serial No. 172,997. (No model.)

*To all whom it may concern:*

Be it known that I, AUGUST W. OBERMANN, a citizen of the United States of America, residing at Pittsburg, in the county of Allegheny and State of Pennsylvania, have invented certain new and useful Improvements in Cooking-Vessels, of which the following is a specification, reference being had therein to the accompanying drawings.

My invention relates to cooking-vessels.

The object it has in view is to so construct such vessels that the water can be poured therefrom and thoroughly strained, the steam allowed to escape, and fresh water supplied, all without removing the lid or cover; and, further, to provide convenient handles adapted to lock the cover on the vessel and at the same time afford means for carrying such vessel, the invention being especially designed as an improvement on the device described in Letters Patent No. 254,500, granted to me March 7, 1882.

To the accomplishment of the above the invention consists in certain novel devices and combination of devices, as will be fully described and claimed.

Figure 1:
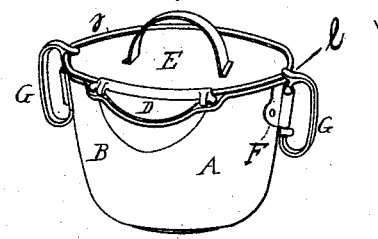
Figure 2:
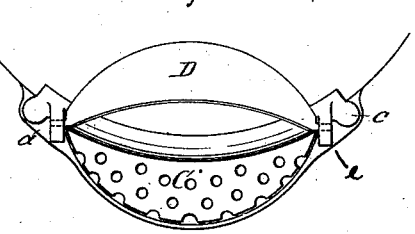
Figure 3:
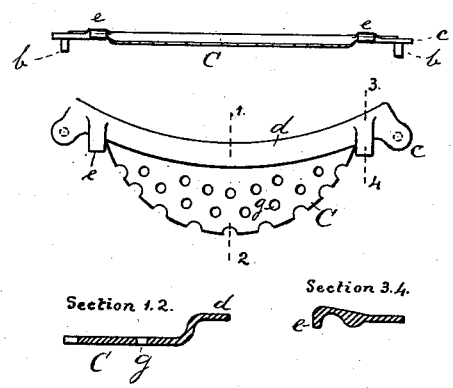
Figure 4:
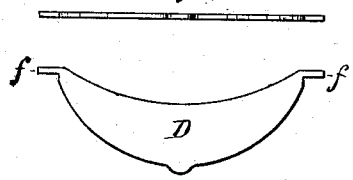
Figure 5:
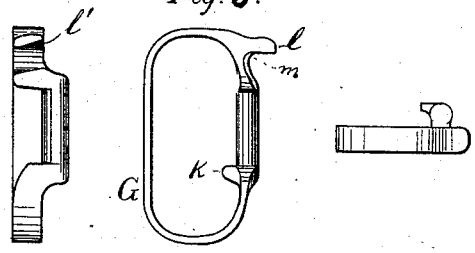
Figure 6:
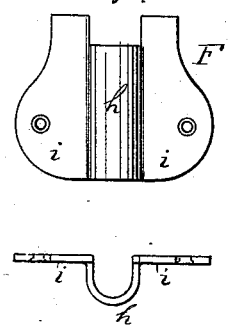

Reference will be made to the accompanying drawings, in which Figure 1 is a view in perspective of a vessel provided with my improvements; Fig. 2, a view of the strainer and its flap as applied to the vessel; Fig. 3, views in detail of the strainer; Fig. 4, views in detail of the strainer-flap; Fig. 5, views in detail of the handle; and Fig. 6, views in detail of the hinge.

Like letters refer to like parts in each view.

A represents a cooking-vessel, which may be composed of any suitable material. It is provided at its front with a spout, B, which rises to a level with its upper edge.

Upon the upper edge of vessel A, and at each side of spout B, is formed a lug or ear, $a$, provided each with an opening through which is passed a pin, $b$, formed one each on the under face of an ear, $c$. These ears $c$ are formed on the ends of a flange, $d$, cast upon the rear edge of a strainer, C, and raised slightly above said strainer. Upon flange $d$ are also cast downwardly-pointed hooks $e$, into which are inserted trunnions $f f$, formed one upon each end of a flap, D. When the several parts are in position, the ends of hooks $e$ press against the upper face of ears $a$, thus holding the flap D in position, but allowing it to be raised and lowered. The strainer C, above referred to, which is preferably a flat piece of metal provided with perforations $g$, as shown, is of a size and form to fit snugly within the spout B, with which the vessel is provided, and the flap D, which, when in position, is directly over this strainer, is of a size and shape to completely cover the same, and thus prevent the escape of steam from the vessel, or to allow of its escape, as may be desired. As before described, the flange $d$, which is cast upon the rear of strainer C, is slightly raised above said strainer, and by means of such construction, when the parts are in position, there is a space left between this flange and the edge of vessel A, into which space the rim of the lid E enters when said lid is placed upon the vessel. Secured to two sides of the vessel, as shown, are hinge-plates F, which consist each of knuckle $h$ and wings $i$. Wings $i$ are provided with suitable holes, through which pins for securing these hinge-plates to the vessel are passed. At their upper ends these wings protrude a short distance above the knuckle $h$, and the lugs thus formed abut, when the hinges are in position, against a rim, $j$, with which these vessels are usually provided. This construction facilitates the placing of these hinges in position, as without them the exact distance from the upper edge of the vessel at which said hinges should be placed would be difficult to determine.

Pivoted in hinges F are the handles G, which are formed with the handle portion proper, and with a circular bar, which is inserted within the knuckle $h$. Above and below this circular bar the handle is bent so as to form suitable shoulders, to abut against the upper and lower edges of knuckles $h$, and prevent any vertical movement of the handles. A lug or projection, $k$, may be formed just below the lower end of the bar referred to, said lug to come in contact with the side of the vessel and prevent the handle from resting too close thereagainst when said handle is turned to free the cover or lid.

Cast upon the upper and inner end of the handle is a lug or projection, $l$, which, when the handle is turned at right angles to the vessel, overlaps the rim of the lid E, and serves to hold said lid in position when the vessel is tilted or moved. The under surface of projection $l$ is slightly beveled, as shown at $l'$ in Fig. 6, so that when the handle is turned this projection is certain to overlap the lid and gradually force said lid tight upon the vessel. At the point $m$ of the handle, Fig. 6, which is immediately below the projection $l$, the handle is formed slightly concave to accommodate itself to the rim of the vessel.

Having thus described my invention, what I claim as new therein, and that for which I desire to secure Letters Patent, is—

1. The combination, with a cooking-vessel provided with a spout and the lid thereof, the vessel provided upon its upper edge and upon each side of the spout with a widened portion, of a detachable strainer for the spout of the vessel connected with the widened portions upon each side of the spout, and a hinged flap covering the same, the strainer being provided with a flange for guiding and holding the lid in position, as described and shown.

2. The combination, with a cooking-vessel provided with a spout and the lid thereof, the vessel being provided upon its upper edge and upon each side of the spout with a widened portion, of a detachable strainer for the spout of the vessel connected with the widened portions upon each side of the spout, and a flap covering the same, the strainer being provided with a flange for guiding and holding the lid, and handles pivoted to the vessel and provided with projections for holding the lid in position, as set forth.

3. The combination, with a cooking-vessel and with the lid thereof, of handles pivoted to the vessel, the handle proper or holding portion of such handles being parallel with the sides of the vessel, and each handle being provided with a lug or projection formed at right angles to the holding portion, as and for the purpose set forth.

4. The combination, with a cooking-vessel and with the lid thereof, of handles pivoted to the vessel, the handle proper or holding portion of such handles being parallel with the sides of the vessel, and each handle being provided with a beveled lug or projection formed at right angles to the holding portion, as set forth.

5. The combination, with a cooking-vessel and with the lid thereof, of handles G, pivoted to said vessel and provided with lugs $l$ and $k$, as and for the purpose set forth.

6. The combination, with a cooking-vessel provided with a spout and the lid thereof, the vessel being formed upon each side of the spout with a widened portion, of a detachable strainer mounted upon such widened portions and provided with a flange, whereby the lid may be guided between such flange and the rim of the vessel, and a detachable flap mounted in hooks formed with the strainer, as set forth.

In testimony whereof I affix my signature in presence of two witnesses.

AUGUST W. OBERMANN.

Witnesses:
M. J. CLAGETT,
ADAM GEO. WHITE.